United States Patent
Richman et al.

(10) Patent No.: US 11,314,503 B2
(45) Date of Patent: Apr. 26, 2022

(54) SOFTWARE DEVELOPMENT DOCUMENTATION USING MACHINE LEARNING

(71) Applicant: Bank of America Corporation, Charlotte, NC (US)

(72) Inventors: Adam B. Richman, Charlotte, NC (US); Jack L. Bishop, III, Evanston, IL (US)

(73) Assignee: Bank of America Corporation, Charlotte, NC (US)

( * ) Notice: Subject to any disclaimer, the term of this patent is extended or adjusted under 35 U.S.C. 154(b) by 33 days.

(21) Appl. No.: 16/895,047

(22) Filed: Jun. 8, 2020

(65) Prior Publication Data

US 2021/0382712 A1    Dec. 9, 2021

(51) Int. Cl.
*G06F 8/73* (2018.01)
*G06N 20/00* (2019.01)
*G06N 5/04* (2006.01)
*G06F 8/75* (2018.01)
*G06F 40/40* (2020.01)
*G06F 16/26* (2019.01)
*G06F 40/30* (2020.01)

(52) U.S. Cl.
CPC .............. *G06F 8/73* (2013.01); *G06F 8/75* (2013.01); *G06F 16/26* (2019.01); *G06F 40/40* (2020.01); *G06N 5/04* (2013.01); *G06N 20/00* (2019.01); *G06F 40/30* (2020.01)

(58) Field of Classification Search
CPC ............ G06F 8/73; G06F 16/26; G06F 40/30; G06N 20/00

USPC .................................................. 717/100–123
See application file for complete search history.

(56) References Cited

U.S. PATENT DOCUMENTS

| | | | |
|---|---|---|---|
| 5,535,323 | A | 7/1996 | Miller et al. |
| 5,754,176 | A | 5/1998 | Crawford |
| 6,208,338 | B1 | 3/2001 | Fischer et al. |
| 6,212,677 | B1 | 4/2001 | Ohkubo et al. |
| 6,389,434 | B1 | 5/2002 | Rivette et al. |

(Continued)

OTHER PUBLICATIONS

Fucci, Davide, Alireza Mollaalizadehbahnemiri, and Walid Maalej. On using machine learning to identify knowledge in API reference documentation. Proceedings of the 2019 27th ACM Joint Meeting on European Software Engineering Conference, pp. 109-119 (Year: 2019).*

(Continued)

*Primary Examiner* — Satish Rampuria

(57) ABSTRACT

A device configured to receive source code for an application and analyze the source code to generate metadata for the source code. The metadata identifies operations performed within the source code. The device is further configured to generate a source code model for the source code based on the metadata for the source code and source code modeling instructions. The source code modeling instructions are configured to map the metadata associated with the source code to fields of the source code model. The device is further configured to convert the source code model into a graphical representation using visualization instructions. The visualization instructions include instructions for converting the source code model into the graphical representation. The device is further configured to output the graphical representation.

20 Claims, 6 Drawing Sheets

(56) References Cited

U.S. PATENT DOCUMENTS

| | | | |
|---|---|---|---|
| 6,724,401 B1 | 4/2004 | Hennum et al. | |
| 6,938,021 B2 | 8/2005 | Shear et al. | |
| 6,993,708 B1 | 1/2006 | Gillig | |
| 7,356,537 B2 | 4/2008 | Reynar et al. | |
| 7,533,369 B2 | 5/2009 | Sundararajan et al. | |
| 7,536,684 B2 | 5/2009 | Patrizio et al. | |
| 7,650,316 B2 | 1/2010 | Peck et al. | |
| 7,836,102 B2 | 11/2010 | Singh | |
| 7,861,153 B2 | 12/2010 | Ahyh et al. | |
| 8,019,579 B1 | 9/2011 | Wey et al. | |
| 8,219,923 B2 | 7/2012 | Peck et al. | |
| 8,494,894 B2 | 7/2013 | Jaster et al. | |
| 8,510,571 B1 | 8/2013 | Chang et al. | |
| 8,732,838 B2 | 5/2014 | Medvedev et al. | |
| 8,768,654 B2 | 7/2014 | Srinivasan et al. | |
| 9,565,200 B2 | 2/2017 | Bacastow et al. | |
| 9,602,529 B2 | 3/2017 | Jones et al. | |
| 9,712,551 B2 | 7/2017 | Grubel et al. | |
| 9,954,746 B2 | 4/2018 | Kashtan et al. | |
| 10,303,755 B2 | 5/2019 | Cullen et al. | |
| 10,509,647 B1 | 12/2019 | Campbell et al. | |
| 10,523,695 B2 | 12/2019 | Fach et al. | |
| 10,552,148 B2 | 2/2020 | Campbell et al. | |
| 11,042,713 B1* | 6/2021 | Platt | G06F 40/295 |
| 2002/0054138 A1 | 5/2002 | Hennum | |
| 2002/0059054 A1 | 5/2002 | Bade et al. | |
| 2002/0059348 A1 | 5/2002 | Lee et al. | |
| 2002/0169803 A1 | 11/2002 | Sampath et al. | |
| 2003/0016238 A1 | 1/2003 | Sullivan et al. | |
| 2003/0083900 A1 | 5/2003 | Khriss et al. | |
| 2003/0144982 A1 | 7/2003 | Reulein et al. | |
| 2004/0010772 A1 | 1/2004 | McKenna et al. | |
| 2004/0093558 A1 | 5/2004 | Weaver | |
| 2005/0262437 A1 | 11/2005 | Patterson et al. | |
| 2006/0075337 A1 | 4/2006 | Jones et al. | |
| 2006/0101321 A1 | 5/2006 | Friedrichowitz et al. | |
| 2006/0143594 A1 | 6/2006 | Grimaldi | |
| 2008/0270974 A1* | 10/2008 | Topchiyski | H04L 67/2842 717/104 |
| 2009/0172533 A1 | 7/2009 | Hamzaoui et al. | |
| 2011/0023021 A1 | 1/2011 | Miyazaki | |
| 2011/0224939 A1 | 9/2011 | Jayaswal et al. | |
| 2015/0057992 A1* | 2/2015 | Danielyan | G06F 40/211 704/2 |
| 2018/0020018 A1 | 1/2018 | Walheim et al. | |
| 2018/0067739 A1* | 3/2018 | Apkon | G06F 8/34 |
| 2018/0343270 A1 | 11/2018 | Ben David et al. | |
| 2019/0065988 A1* | 2/2019 | Eck | G06N 5/022 |
| 2019/0166154 A1 | 5/2019 | Steele et al. | |
| 2019/0354690 A1 | 11/2019 | Brigand | |
| 2019/0370477 A1 | 12/2019 | Agarwal | |

OTHER PUBLICATIONS

Abukwaik, Hadil, et al. "Extracting conceptual interoperability constraints from API documentation using machine learning." Proceedings of the 38th International Conference on Software Engineering Companion. 2016.pp. 701-703 (Year: 2016).*

Hashemi, Yalda, Maleknaz Nayebi, and Giuliano Antoniol. "Documentation of Machine Learning Software." 2020 IEEE 27th International Conference on Software Analysis, Evolution and Reengineering (Saner). IEEE, 2020.pp.666-667 (Year: 2020).*

Ferenc, Rudolf, et al. "Design pattern mining enhanced by machine learning." 21st IEEE International Conference on Software Maintenance (ICSM'05). IEEE, 2005.pp. 1-10 (Year: 2005).*

Treude, Christoph, Martin P. Robillard, and Barthélémy Dagenais. "Extracting development tasks to navigate software documentation." IEEE Transactions on Software Engineering 41.6 (2014): pp. 565-581. (Year: 2014).*

Shepperd, Martin, David Bowes, and Tracy Hall. "Researcher bias: The use of machine learning in software defect prediction." IEEE Transactions on Software Engineering 40.6 (2014): pp. 603-616. (Year: 2014).*

* cited by examiner

SOFTWARE DEVELOPMENT DOCUMENTATION USING MACHINE LEARNING

TECHNICAL FIELD

The present disclosure relates generally to software development, and more specifically to generating software development documentation using machine learning.

BACKGROUND

Existing computer systems lack the ability to analyze source code for applications and the ability to generate documentation from source code. Analyzing source code poses several technical challenges. For instance, the way that programs are written is dynamic because a person can implement a particular function in a variety of ways. This means that a computer system needs to be able to accurately interpret the operations that are being performed within a source code file regardless of the implementation techniques that are used. Trying to correctly interpret source code poses a technical challenge for a computing system. This can lead to inefficiencies that consume the limited amount of processing resourcing that a computer system has available. By consuming the available processing resources, these inefficiencies will reduce the computer system's ability to process data and reduce the throughput of the computer system. In addition, generating documentation for a source code file also poses a technical challenge when the computing system is unable to accurately interpret the operations performed by the source code.

SUMMARY

The system disclosed in the present application provides a technical solution to the technical problems discussed above by analyzing source code and generating documentation for the source code using machine learning and other techniques. The disclosed system provides several practical applications and technical advantages which include a process for analyzing source code using a combination of different analysis techniques and machine learning. This process improves the functioning of an underlying computing system by training the computer system how to interpret source code using machine learning. This process improves the computer system's ability to accurately interpret source code. By using machine learning, a computing system is able to reduce the number of resources and the amount of time that a computing system's resources are occupied when analyzing and interpreting the text within a source code file. This process results in a more consistent and efficient way of analyzing source code which allows the computer system to better manage its memory and processing resources. By improving the computer system's ability to manage its resources, the computer system is able to provide a higher throughput compared to using other existing approaches. In addition, by enabling the computer system to interpret source code, this process also enables the computer system to automatically generate documentation for the source code based on the operations performed by the source code.

In one embodiment, the computer system comprises a code analyzing device that is configured to receive source code for an application. The code analyzing device is further configured to analyze the source code to generate metadata for the source code. The metadata identifies operations that are performed within the source code. For example, the metadata may comprise data flow path information, branching logic information, and/or any other suitable type of metadata that is associated with the source code. The device is further configured to use source code modeling instructions to generate a source code model for the source code based on the metadata for the source code. The source code model comprises a plurality of fields that are configured to store metadata that is associated with the source code. The source code modeling instructions provide instructions and techniques for mapping the metadata that is associated with the source code to fields of the source code model. The device is further configured to use visualization instructions and techniques to convert the source code model into a graphical representation of the source code model. The visualization instructions provide instructions and techniques for converting the source code model into the graphical representation of the source code model. This process provides a consistent approach for converting the metadata data within a source code model into a format that is more easily interpreted by a human. The device is further configured to output the graphical representation.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
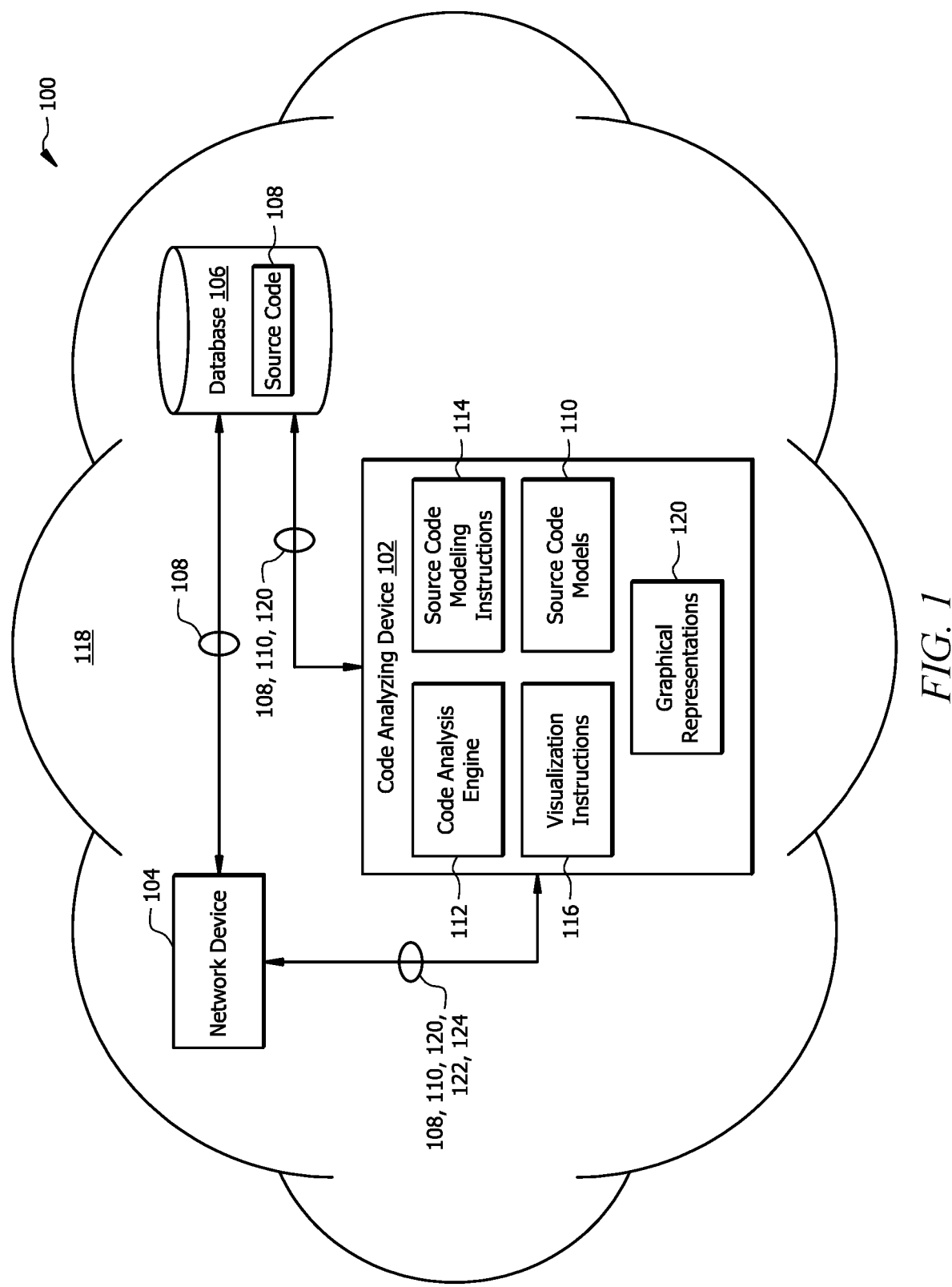
FIG. 1 is a schematic diagram of a code analysis system configured to analyze source code using machine learning.

FIG. 1 is a schematic diagram of a code analysis system 100 that is configured to analyze source code 108 using machine learning and other techniques. In one embodiment, the system 100 comprises a code analyzing device 102, one or more network devices 104 configured to generate source code 108, and one or more databases 106. The code analyzing device 102, the one or more network devices 104, and the one or more databases 106 are in signal communication with each other within a network 118.

In FIG. 1, the code analyzing device 102, the network device 104, and the database 106 are shown as separate devices. In some embodiments, the code analyzing device 102, the network device 104, and/or the database 106 may be combined into a single device. For example, the code analyzing device 102 may be integrated with the network device 104 and/or the database 106. The system 100 may be configured as shown or in any other suitable configuration.

The network 118 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 118 may be configured to support any suitable type of communication protocol as would be appreciated by one of ordinary skill in the art.

Network Devices

A network device 104 is a device that is configured to generate source code 108 for an application or project. For example, a network device 104 may be a computing device that is associated with a software developer. Examples of a network device 104 include, but are not limited to, a laptop, a computer, a tablet, a smartphone, a virtual machine, or any other suitable type of computing device. A network device 104 may be further configured to send source code 108 for an application to a database 106 for storing and/or to send the source code 108 to the code analyzing device 102 for processing to generate a source code model 110 and documentation for the source code 108.

Code Analyzing Device

The code analyzing device 102 is generally configured to analyze source code 108 and to generate documentation for the source code 108 using a source code model 110. The code analyzing device 102 comprises a code analysis engine 112, source code modeling instructions 114, and visualization instructions 116. The code analyzing device 102 may be configured as shown or in any other suitable configuration. Additional information about the hardware configuration of the code analyzing device 102 is described in FIG. 6.

The code analysis engine 112 is generally configured to receive source code 108 and to analyze the source code 108 to generate metadata for the source code 108. The metadata describes the source code and identifies operations that are performed within the source code. Examples of metadata for the source code 108 include, but are not limited to, a source code identifier, author information, timestamps, version control information, data flow path information, branching logic information, semantic information, data operations information, comments, or any other suitable type of information that is associated with the source code 108.

Figure 3:
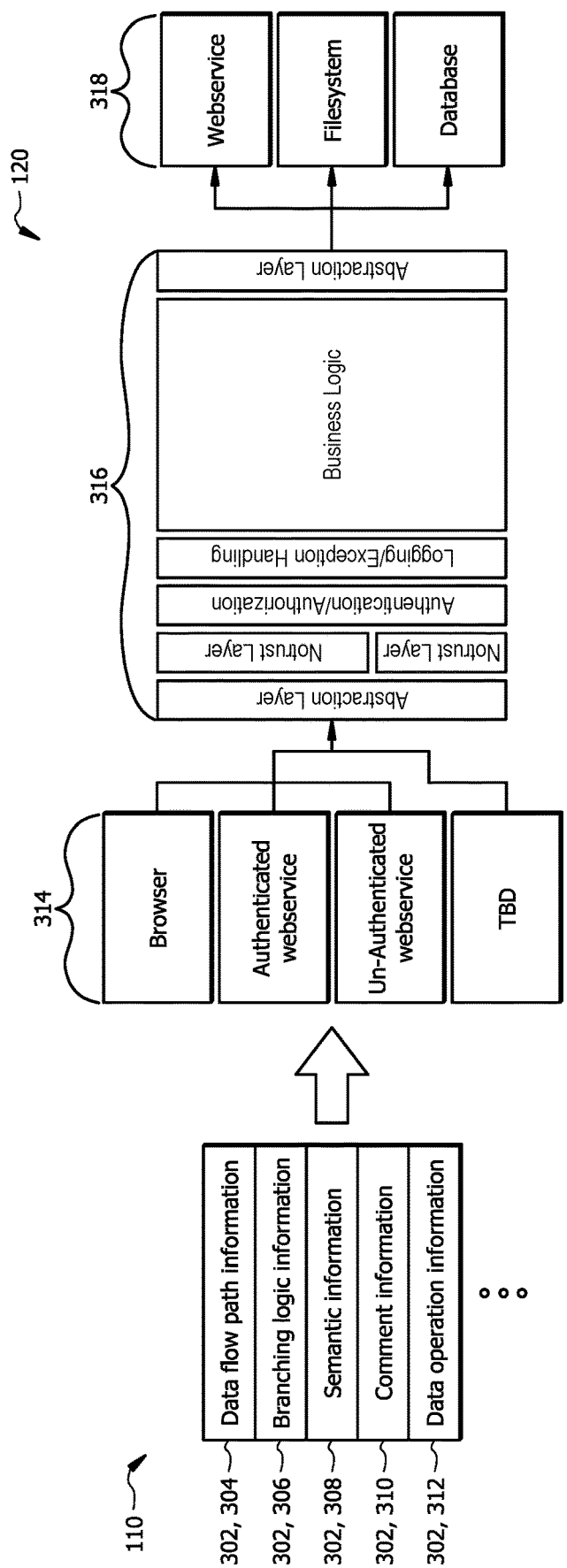
FIG. 3 is an example of a graphical representation of a high-level overview for a source code model.

The code analysis engine 112 is further configured to use the source code modeling instructions 114 to generate a source code model 110 based on the metadata from the source code 108. The source code model 110 comprises a plurality of fields that are configured to store metadata that is associated with a source code 108. The source code modeling instructions 114 map the metadata that is associated with source code 108 to fields 302 of a source code model 110. Referring to FIG. 3 as an example, the source code model 110 comprises a plurality of fields 302 that can each be populated with information that is associated with the source code 108. In this example, the source code model 110 is configured to store data flow path information 304, branching logic information 306, semantic information 308, comment information 310, and data operation information 312. In other examples, the source code model 110 may be configured to store any other suitable type or combination of information that is associated with the source code 108. In FIG. 3, the source code model 110 is represented as a table data structure. In other examples, the source code model 110 may be implemented to use any other suitable type of data structure.

Figure 4:
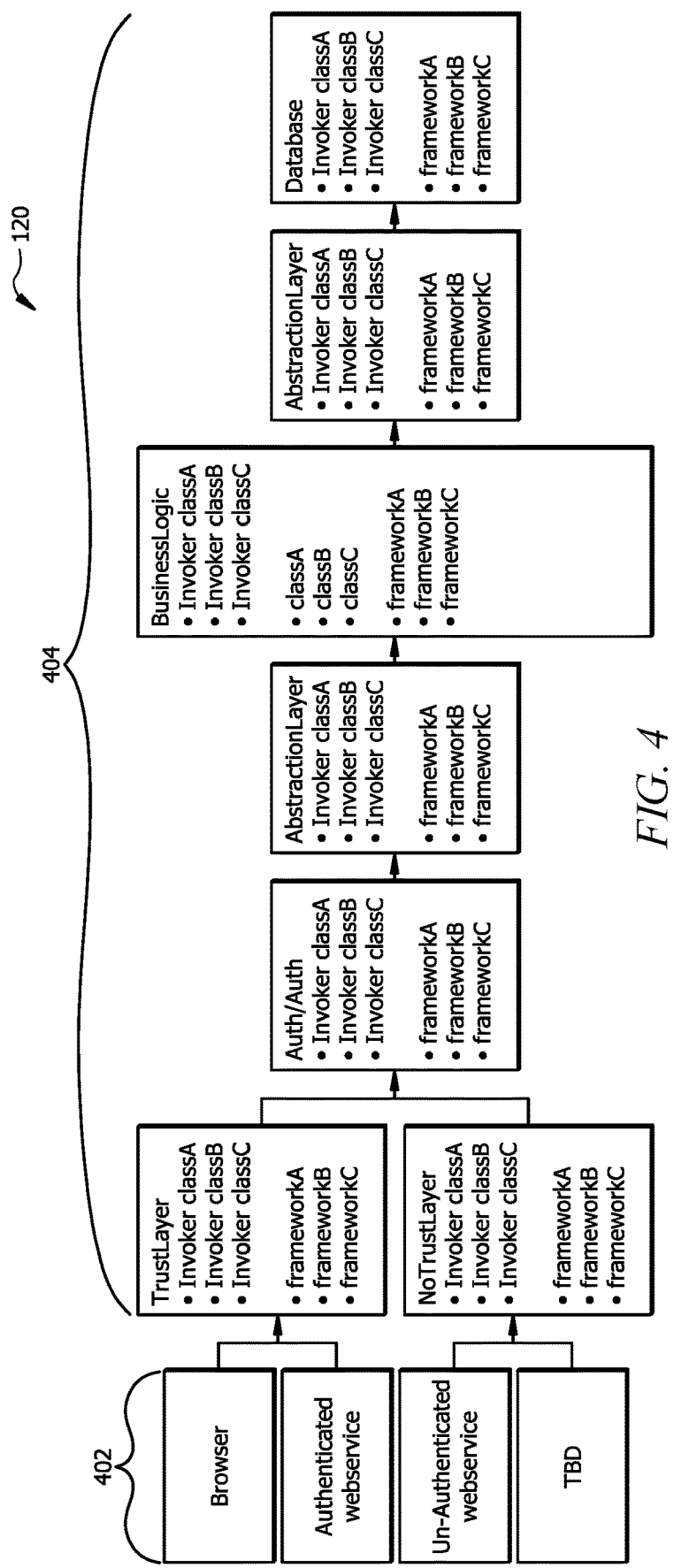
FIG. 4 is another example of a graphical representation of a control flow for a source code model.
Figure 5:
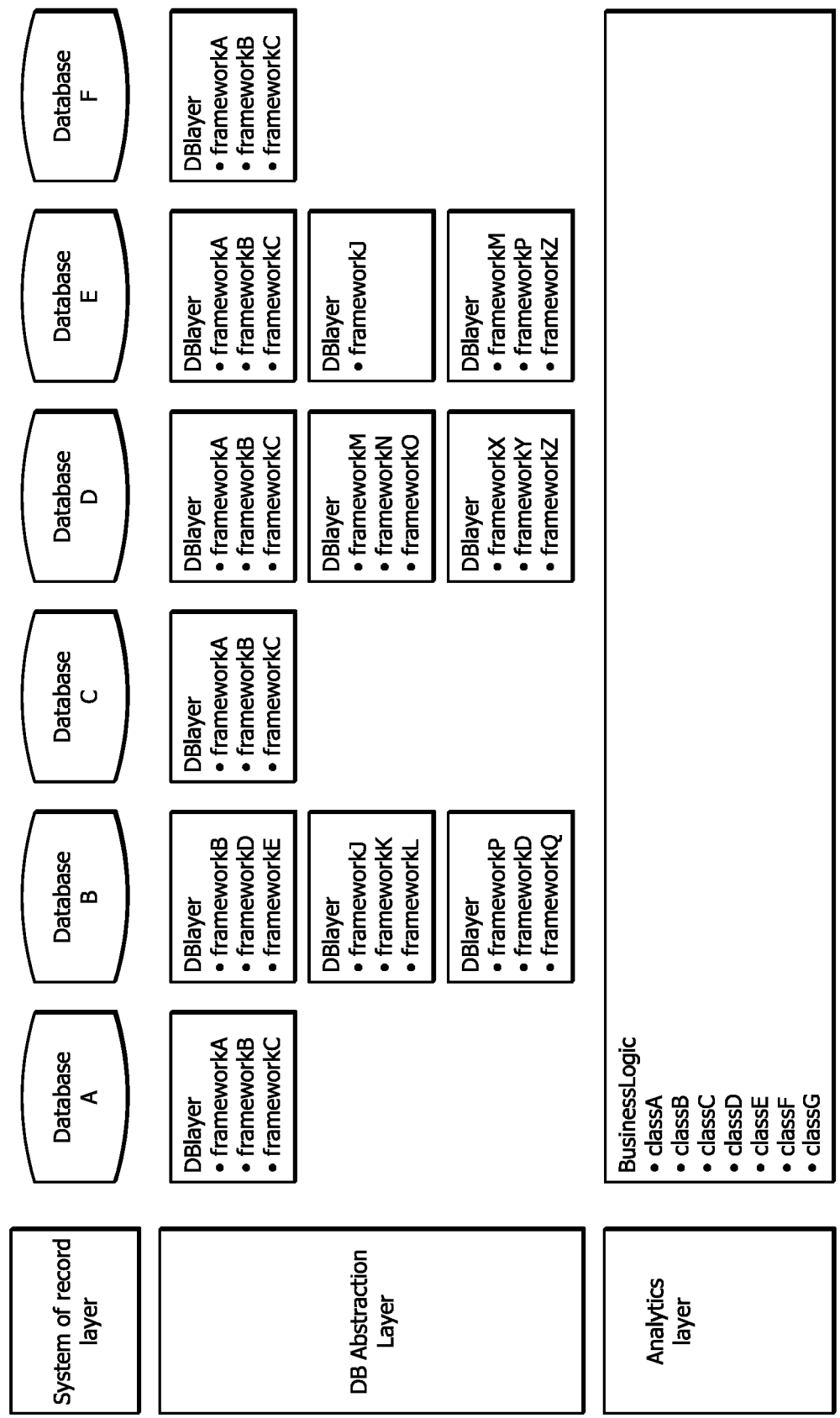
FIG. 5 is another example of a graphical representation of a data flow for a source code model.

The code analysis engine 112 is further configured to use the visualization instructions 116 to generate a graphical representation 120 for the source code model 110. The visualization instructions 116 comprises instructions for converting a source code model 110 into a graphical representation 120 of the source code model 110. A graphical representation 120 may be in the form of any suitable type of data structure for presenting or displaying information from a source code model 110. Examples of graphical representations 120 include, but are not limited to, architecture diagrams, flow charts, protocol diagrams, state diagrams, text descriptions, web pages, reports, or any other suitable type of representation. A graphical representation 120 may be generated and stored as a text document, a presentation, an image, a table, a webpage, or any other suitable type of file format. Referring again to the example in FIG. 3, the graphical representation 120 of the source code model 110 is shown as a high-level overview representation of an architecture diagram. In this example, the graphical representation 120 identifies a plurality of data sources 314, an application architecture overview 316, and a plurality of data sinks 318 that are associated with the source code 108. Referring to FIG. 4 as another example, the graphical representation 120 is an architecture diagram that identifies a control flow that is associated with the source code 108. In this example, the architecture diagram identifies services 402 and an execution control flow 404 that are associated with the source code 108. Referring to FIG. 5 as another example, the graphical representation 120 is an architecture diagram that identifies a data flow that is associated with the source code 108. In this example, the architecture diagram identifies data flows within the source code 108. In other examples, an architecture diagram may identify any other suitable type or combination of information that is associated with the source code 108. In other examples, the graphical representation 120 may be in any other suitable format. An example of the code analysis engine 112 in operation is described below in FIG. 2. The visualization instructions 116 provide a consistent approach for converting or rendering the metadata within a source code model 110 into a format that is more easily interpreted by a human.

Databases

A database 106 is generally configured to store data for network devices 104 and the code analyzing device 102. For example, a database 106 may be configured to store source code 108 or any other suitable type of data. Examples of the database 106 include, but are not limited to, a source code repository, a version control repository, a file repository, a data store, a server, a network-attached storage (NAS) device, a computing device, a shared folder, a memory (e.g. memory 604) or any other suitable type of network device.

Source Code Analyzing and Documentation Generation Process

Figure 2:
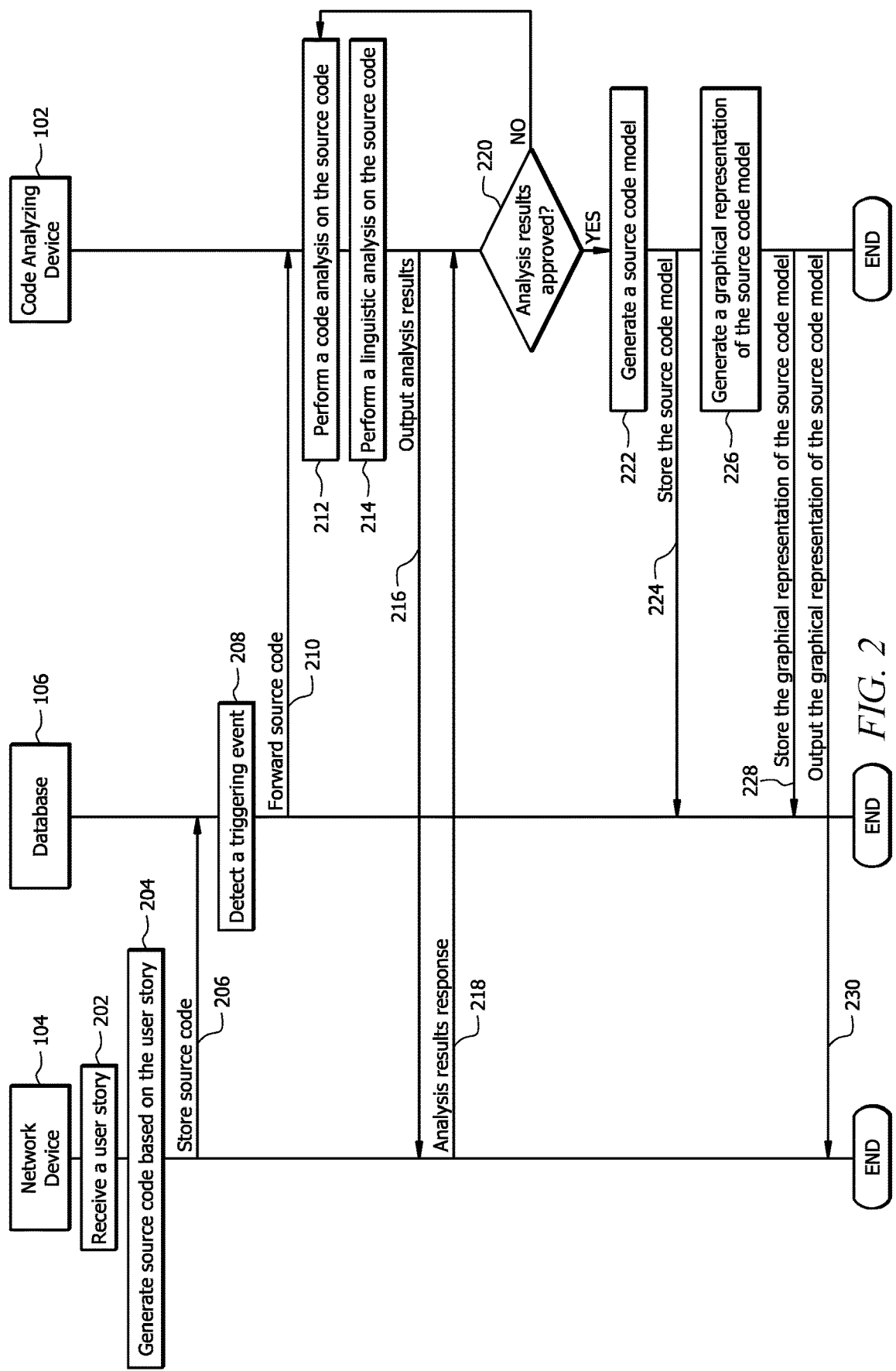
FIG. 2 is a protocol diagram of an embodiment of a source code analyzing method for software development using machine learning.

FIG. 2 is a protocol diagram of an embodiment of a source code analyzing method 200 for software development using machine learning and other techniques. The code analysis system 100 may employ method 200 to automatically generate documentation (e.g. an architecture diagram) for source code 108 for applications as they are created. For example, the code analysis system 100 may be configured to monitor the development and modifications to source code 108 and to generate source code models 110 that can be used to generate documentation (e.g. a graphical representation 120 of an architecture diagram) for the source code 108. This process enables the automatic generation of documentation for source code 108 without relying on a software developer to generate the documentation. This process may also be used in both waterfall and agile software development environments. This process is software development life-cycle (SDLC) agnostic and relies minimally on the use of source code version control.

At step 202, the network device 104 receives a user story. In this example, the network device 104 is a computing device of a software developer. A user story is a functional description of an application or application feature. For instance, a user story may comprise a text-based description for the desired functionality and/or aesthetics of an application, a graphical user interface, a web interface, a log-in screen, a new button, or any other suitable type of application feature. A user story may describe a new application feature or modifications to an existing application feature. As an example, the network device 104 may receive an email or an application feature request that comprises a text description for a new log-in screen for a web-based application.

At step 204, the network device 104 generates source code 108 based on the user story. Here, the software developer generates source code 108 that corresponds with the requested application feature using the network device 104. The source code 108 may comprise one or more text-based files or documents that comprise programming code for implementing the application feature. For example, the source code 108 may comprise header files, library files, scripts, source code files, project files, and/or any other suitable type of file that is associated with the source code 108 for an application feature.

At step 206, the network device 104 stores the generated source code 108 in the database 106. For example, the database 106 may be a shared file repository that is accessible by multiple software developers. In this example, the software developer may commit or store the generated source code 108 into the database 106 which allows other software developers to review, test, and/or modify the source code 108.

At step 208, the code analyzing device 102 detects a triggering event. For example, the code analyzing device 102 is configured to detect a triggering event when new or modified source code 108 is stored in the database 106. For instance, the code analyzing device 102 may be configured to use webhooks on an interface of the database 106 to detect when new or modified source code 108 has been stored in the database 106. The database 106 will then trigger a triggering event in response to detecting the source code 108 being stored. In other examples, a triggering event may be in response to a request from a software developer to generate documentation for source code 108 stored in the database 106. For instance, the software developer may use the network device 104 to identify source code 108 that is to be analyzed for generating documentation.

At step 210, the code analyzing device 102 requests the source code 108 from the database 106 in response to detecting the triggering event. In one embodiment, the database 106 may send the source code 108 with a source code identifier to the code analyzing device 102 in response to receiving a request from the code analyzing device 102. The source code identifier may be any suitable type of identifier that uniquely identifies the source code 108. The source code identifier allows the database 106 to link the source code 108 with any generated documentation from the code analyzing device 102.

After receiving the source code 108, the code analyzer device 102 begins processing and analyzing the source code 108 using machine learning and other techniques to generate metadata that describe different aspects of the source code 108. The generated metadata can then be used to generate a source code model 110 that represents the functionality of the source code 108. At step 212, the code analyzing device 102 performs a code analysis on the source code 108. Here, the code analyzer device 102 generates metadata for the source code 108 based on the code within the source code 108 and the operations performed when executing the source code 108. In one embodiment, the code analysis comprises executing the source code 108 and stepping through the operations performed by the source code 108 to identify data flow paths and/or branching logic within the source code 108. For example, the code analyzer device 102 may identify data flow paths and branching logic within the source code 108 by monitoring and tracking changes to variables and data while the source code 108 executes. The code analyzer device 102 may then generate metadata for the source code 108 that identifies the identified data flow paths and branching logic within the source code 108.

At step 214, the code analyzing device 102 performs a linguistic analysis on the source code 108. Here, the code analyzer device 102 generates metadata for the source code 108 based on text within the source code 108. In one embodiment, the linguistic analysis comprises parsing the source code 108 to identify text from within the source code 108. For example, the code analyzing device 102 may parse to source code 108 to identify delimiters that correspond with comments within the source code 108. The linguistic analysis may further comprise performing natural language processing on the identified text to identify data operations that are performed within the source code 108 based on the identified text. For example, the comments may comprise keywords or a description of the functionality for a portion of the source code 108. The code analyzing device 102 may then identify data operations that correspond with the identified keywords or text within the comments. For example, the code analyzing device 102 may use a lookup table that maps keywords from a source code 108 to particular functions or data operations. The code analyzer device 102 may then generate metadata for the source code 108 that identifies the identified data operations within the source code 108.

At step 216, the code analyzing device 102 outputs the analysis results 122 to the network device 104. The code analyzing device 102 compiles the metadata results from the code analysis and the linguistic analysis to generate analysis results 122. The code analyzing device 102 then sends the analysis results 122 to the network device 104 for approval or confirmation from the software developer. This process gives the software developer an opportunity to confirm whether the analysis results 122 accurately represent the source code 108. For example, the code analyzing device 102 may send an email that contains the analysis results 122. As another example, the code analyzing device 102 may send a link that provides access to the analysis results 122. As another example, the code analyzing device 102 may send the analysis results 122 to network device 104 as an application notification. In other examples, the code analyzing device 102 may send the analysis results 122 to the network device 104 using any suitable technique.

At step 218, the code analyzing device 102 receives an analysis results response 124 from the network device 104 in response to sending the analysis results 122 to the network device 104. The analysis results response 124 indicates whether the software developer has approved the analysis results 122. As an example, the software developer may reply to the analysis results 122 by using a predetermined value or command that indicates whether the software developer approves of the analysis results. For instance, the software developer may indicate an approval by sending a message to the database 106 with a predetermined keyword, for example, "approved." As another example, the software developer may indicate an approval by selecting a button or link on an application notification. In other examples, the software developer may send the analysis results response 124 using any suitable technique.

At step 220, the code analyzing device 102 determines whether the analysis results were approved. Here, the code analyzing device 102 checks the analysis results response 124 to determine whether the analysis results response 124 indicates an approval for the analysis results 122. The code analyzing device 102 returns to step 212 in response to determining that the analysis results 122 were not approved. In this case, the code analyzing device 102 returns to step 212 to modify the code analysis techniques that were used and then reanalyzes the source code 108 using the modified code analysis techniques. Otherwise, the code analyzing device 102 proceeds to step 220 in response to determining that the analysis results 122 were approved. In this case, the code analyzing device 102 has received approval for generating a source code model 110 based on the analysis results 122.

In one embodiment, steps 216-218 may be optional. In this case, the code analyzing device 102 may automatically proceed to step 220 after generating the analysis results 122 without seeking approval. This option may increase performance and efficiency by reducing the delays associated with seeking approval before generating a source code model 110.

At step 222, the code analyzing device 102 generates a source code model 110 using source code modeling instructions 114. The source code modeling instructions 114 provide instructions for mapping metadata from the analysis results 122 to fields 302 of a source code model 110. Referring to the example in FIG. 3, the code analyzing device 102 may use the source code modeling instructions 114 to generate a source code model 110 that comprises data flow path information 304, branching logic information 306, semantic information 308, comment information 310, and data operation information 312. Data flow path information 304 may comprise information about a sequence of data operations that are performed on data within the source code 108. Branching logic information 306 may comprise information about logic that is used within the source code 108. Semantic information 308 may comprise information about keywords that are used within the source code 108. Comment information 310 may comprise text from comments that are within the source code 108. Data operation information 312 may comprise information about functions and data operations that are used in the source code 108. In other examples, the code analyzing device 102 may use source code modeling instructions 114 that comprise any other suitable type of mapping of metadata from the analysis results to fields 302 of a source code model 110.

As an example, the code analyzing device 102 may identify information that is associated with a control flow or a sequence of data operations that are performed within the source code 108. In this example, the code analyzing device 102 may use the source code modeling instructions 114 to populate fields of the source code model 110 with the information that is associated with the sequence of data operations that are performed within the source code 108. For instance, the code analyzing device 102 may populate the data flow path information field 302 with the sequence of data operations that are performed within the source code 108.

As another example, the code analyzing device 102 may identify information that is associated with conditional logic that is used within the source code 108. In this example, the code analyzing device 102 may use the source code modeling instructions 114 to populate fields of the source code model 110 with the information that is associated with the conditional logic that is used within the source code 108. For instance, the code analyzing device 102 may populate the branching logic information field 302 with the information that is associated with the conditional logic that is used within the source code 108.

As another example, the code analyzing device 102 may perform a semantic analysis to identify information that is associated with keywords (e.g. function names) that are used within the source code 108. In this example, the code analyzing device 102 may use the source code modeling instructions 114 to populate fields of the source code model 110 with the information that is associated with the keywords that are used within the source code 108. For instance, the code analyzing device 102 may populate the semantics information field 302 with the information that is associated with the keywords that are used within the source code 108.

As another example, the code analyzing device 102 may identify information that is associated with comments from within the source code 108. In this example, the code analyzing device 102 may use the source code modeling instructions 114 to populate fields of the source code model 110 with the information that is associated with the comments from within the source code 108. For instance, the code analyzing device 102 may populate the comments information field 302 with the information that is associated with the comments from within the source code 108.

As another example, the code analyzing device 102 may identify information that is associated with one or more data operations that are used within the source code 108. In this example, the code analyzing device 102 may use the source code modeling instructions 114 to populate fields of the source code model 110 with the information that is associated with the one or more data operations that are used within the source code 108. For instance, the code analyzing device 102 may populate the data operations information field 302 with the information that is associated with the one or more data operations that are used within the source code 108.

Returning to FIG. 2 at step 224, the code analyzing device 102 stores the source code model 110. In one embodiment, the code analyzing device 102 sends a copy of the source code model 110 to the database 106 for storage. For example, the code analyzing device 102 may send the source code model 110 with the source code identifier that identifies the source code 108. In this example, the database 106 may associate and store the source code model 110 with its corresponding source code 108 within the database 106. In some embodiments, the code analyzing device 102 may also send a copy of the source code model 110 to the network device 104. In some embodiments, step 224 may be optional and omitted.

At step 226, the code analyzing device 102 generates a graphical representation 120 of the source code model 110 using visualization instructions 116. The visualization instructions 116 provides instructions for converting the source code model 110 into a graphical representation 120 that can be more easily interpreted than the raw data in the source code model 110. For example, the visualization instructions 116 may comprise instructions for generating paths in an architecture diagram that corresponds with data flow paths within the source code 108. In this example, the code analyzing device 102 may use data flow path information 304 from the source code model 110 with the visualization instructions 116 to generate at least a portion of an architecture diagram for the source code 108.

As another example, the visualization instructions 116 may comprise instructions for generating an architecture diagram that corresponds with branching logic within the source code 108. In this example, the code analyzing device 102 may use branching logic information 306 from the source code model 110 with the visualization instructions 116 to generate at least a portion of an architecture diagram for the source code 108. An example of this type of architecture diagram is shown in FIG. 4.

As another example, the visualization instructions 116 may comprise instructions for generating an architecture diagram that corresponds with a control flow or data operations from the source code 108. In this example, the code analyzing device 102 may use data operation information 312 from the source code model 110 with the visualization instructions 116 to generate at least a portion of an architecture diagram for the source code 108. An example of this type of architecture diagram is shown in FIG. 5.

As another example, the visualization instructions 116 may comprise instructions for generating a text description based on information from the source code model 110. In this example, the code analyzing device 102 may use data flow path information 304, branching logic information 306, semantic information 308, comment information 310, and/or data operation information 312 to generate a text description for the source code 108. In other examples, the visualization instructions 116 may comprise any other suitable type of instructions for generating a graphical representation 120 of the source code model 110.

In one embodiment, the visualization instructions 116 may further comprise instructions for overlaying or combining multiple generated architecture diagrams. For example, the code analyzing device 102 may generate multiple portions of architecture diagram using various information from the source code model 110. The code analyzing device 102 may then combine multiple portions of the architecture diagram together to form a composite architecture diagram based on instructions provided by the visualization instructions 116. For example, the visualization instructions 116 may comprise instructions for identifying and linking together similar elements from between different architecture diagrams to form a composite architecture diagram.

At step 228, the code analyzing device 102 stores the graphical representation 120 of the source code model 110. In one embodiment, the code analyzing device 102 sends the graphical representation 120 of the source code model 110 to the database 106 for storage. For example, the code analyzing device 102 may send the graphical representation 120 of the source code model 110 with the source code identifier that identifies the source code 108. In this example, the database 106 may associate and store the graphical representation 120 of the source code model 110 with its corresponding source code 108 within the database 106. In some embodiments, step 228 may be optional and omitted.

At step 230, the code analyzing device 102 outputs the graphical representation 120 of the source code model 110. For example, the code analyzing device 102 may send a copy of the graphical representation 120 of the source code model 110 to the network device 104 for storage. In this example, the network device 104 may also present the graphical representation 120 of the source code model 110 to a software developer. This process allows a copy of the graphical representation 120 of the source code model 110 to be stored locally on the network device 104 so that it can be viewed and referenced by the software developer.

Once the documentation (i.e. the source code model 110 and the graphical representation 120 of the source code model 110) has been generated, this documentation may also be used for other processes such as reporting, threat analysis, and debugging. For example, a software developer may use the generated documentation to identify vulnerabilities in the source code 108. As another example, the software developer may use the generated documentation to troubleshoot and debug an error in the source code 108.

Code Analyzing Device Hardware Configuration

Figure 6:
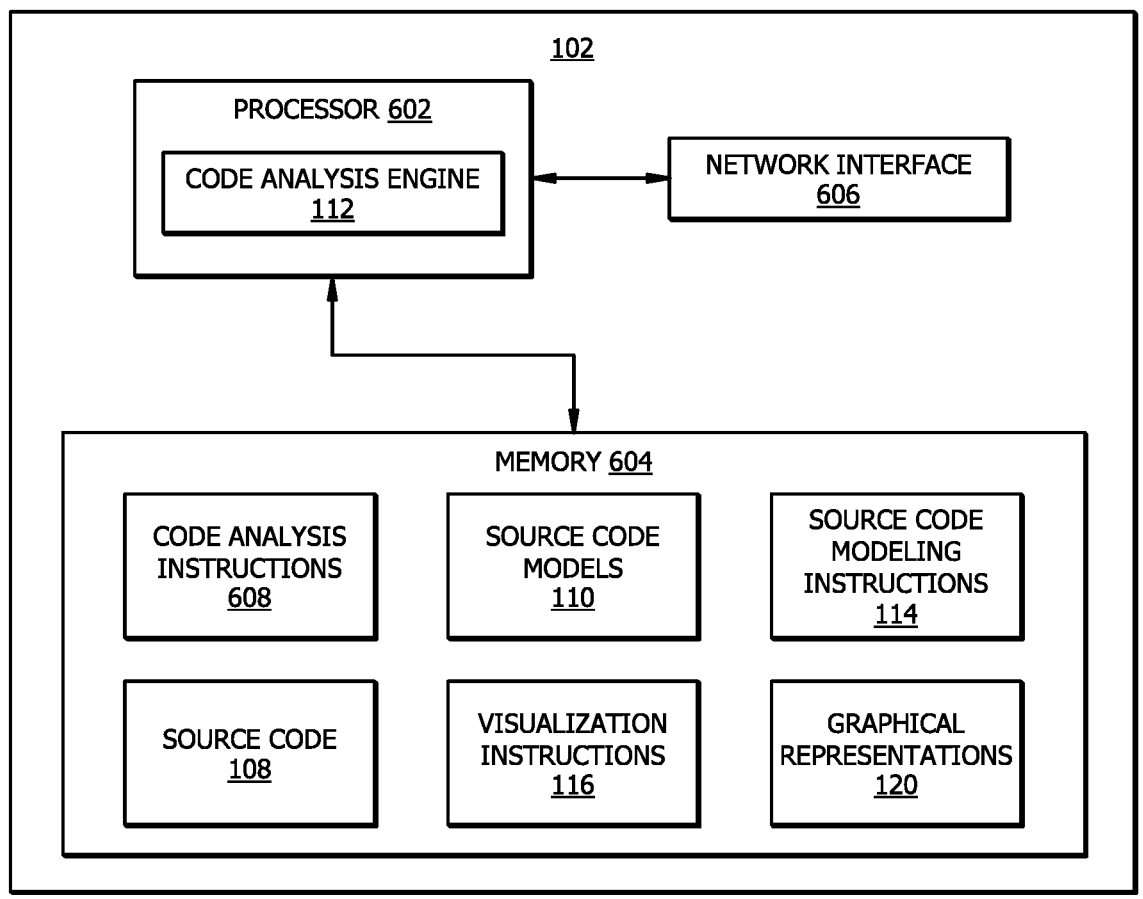
FIG. 6 is a schematic diagram of an embodiment of a device configured to generate documentation for software development using machine learning.

FIG. 6 is a schematic diagram of an embodiment of a device (e.g. code analyzing device 102) configured to generate documentation for software development using machine learning and other techniques. The code analyzing device 102 comprises a processor 602, a memory 604, and a network interface 606. The code analyzing device 102 may be configured as shown or in any other suitable configuration.

The processor 602 comprises one or more processors operably coupled to the memory 604. The processor 602 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 604. The one or more processors are configured to process data and may be implemented in hardware or software. For example, the processor 602 may be 8-bit, 16-bit, 32-bit, 64-bit, or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a code analysis engine 112. In this way, processor 602 may be a special-purpose computer designed to implement the functions disclosed herein. In an embodiment, the code analysis engine 112 is implemented using logic units, FPGAs, ASICs, DSPs, or any other suitable hardware. The code analysis engine 112 is configured to operate as described in FIGS. 1 and 2. For example, the code analysis engine 112 may be configured to perform the steps of method 200 as described in FIG. 2.

The memory 604 comprises one or more disks, tape drives, or solid-state drives, and may be used as an over-flow data storage device, to store programs when such programs are selected for execution, and to store instructions and data that are read during program execution. The memory 604 may be volatile or non-volatile and may comprise a read-only memory (ROM), random-access memory (RAM), ternary content-addressable memory (TCAM), dynamic random-access memory (DRAM), and static random-access memory (SRAM).

The memory 604 is operable to store code analysis instructions 608, source code 108, source code models 110, source code modeling instructions 114, visualization instructions 116, graphical representations 120, and/or any other data or instructions. The code analysis instructions 608 may comprise any suitable set of instructions, logic, rules, or code operable to execute the code analysis engine 112. The code analysis instructions 608, source code 108, source code models 110, source code modeling instructions 114, visualization instructions 116, and graphical representations 120 are configured similar to the code analysis instructions 608, source code 108, source code models 110, source code modeling instructions 114, visualization instructions 116, and graphical representations 120 described in FIGS. 1 and 2, respectively.

The network interface 606 is configured to enable wired and/or wireless communications. The network interface 606 is configured to communicate data between the code analyzing device 102 and other devices (e.g. network devices 104 and databases 106), systems, or domains. For example, the network interface 606 may comprise a WIFI interface, a LAN interface, a WAN interface, a modem, a switch, or a router. The processor 602 is configured to send and receive data using the network interface 606. The network interface 606 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A code analyzing device, comprising:
a memory operable to store:
source code modeling instructions comprising a plurality of metadata associated with a source code, wherein:
each metadata is associated with a field of a source code model; and
the source code model comprises a plurality of fields configured to store metadata associated with source code; and
visualization instructions comprising instructions for converting a source code model into a graphical representation; and
a processor operably coupled to the memory, configured to:
receive source code for an application;
analyze the source code to generate metadata for the source code, wherein:
analyzing the source code comprises:
executing the source code; and
tracking variable changes while executing the source code; and
the metadata identifies operations performed within the source code;
identify information that is associated with a sequence of data operations that are performed by the source code within the metadata for the source code;
populate a field of the source code model with the information that is associated with the sequence of data operations that are performed by the source code in accordance with the source code modeling instructions;
generate at least a portion of an architecture diagram based on the populated field of the source code model in accordance with the visualization instructions to generate a graphical representation of the source code model; and
output the graphical representation.

2. The device of claim 1, wherein:
analyzing the source code comprises identifying data flow paths within the source code; and
the metadata for the source code comprises information associated with the identified data flow paths within the source code.

3. The device of claim 1, wherein:
analyzing the source code comprises identifying branching logic within the source code; and
the metadata for the source code comprises information associated with the identified branching logic within the source code.

4. The device of claim 1, wherein:
analyzing the source code comprises:
identifying keywords within the source code; and
identifying data operations that are associated with the identified keywords; and
the metadata for the source code comprises information associated with the identified data operations.

5. The device of claim 1, wherein:
analyzing the source code comprises:
identifying comments within the source code; and
performing natural language processing on the identified comments to identify data operations that are performed within the source code; and
the metadata for the source code comprises information associated with the identified data operations.

6. The device of claim 5, wherein the graphical representation comprises a text description for the source code based at least in part on the identified comments within the source code.

7. The device of claim 1, wherein the processor is configured to detect a triggering event in response to the source code being stored in a database; and
wherein receiving the source code for the application in response to the triggering event.

8. A code analyzing method, comprising:
receiving a source code for an application;
analyzing the source code to generate metadata for the source code, wherein:
   analyzing the source code comprises:
      executing the source code; and
      tracking variable changes while executing the source code; and
   the metadata identifies operations performed within the source code;
identifying information that is associated with a sequence of data operations that are performed by the source code within the metadata for the source code;
populating a field of a source code model with the information that is associated with the sequence of data operations that are performed by the source code in accordance with source code modeling instructions, wherein:
   the source code modeling instructions comprise a plurality of metadata associated with the source code; and
   each metadata is associated with a field of the source code model;
generating at least a portion of an architecture diagram based on the populated field of the source code model in accordance with visualization instructions to generate a graphical representation of the source code model, wherein the visualization instructions comprise instructions for converting the source code model into the graphical representation of the source code model; and
outputting the graphical representation.

9. The method of claim 8, wherein:
analyzing the source code comprises identifying data flow paths within the source code; and
the metadata for the source code comprises information associated with the identified data flow paths within the source code.

10. The method of claim 8, wherein:
analyzing the source code comprises identifying branching logic within the source code; and
the metadata for the source code comprises information associated with the identified branching logic within the source code.

11. The method of claim 9, wherein:
analyzing the source code comprises:
   identifying keywords within the source code; and
   identifying data operations that are associated with the identified keywords; and
the metadata for the source code comprises information associated with the identified data operations.

12. The method of claim 8, wherein:
analyzing the source code comprises:
   identifying comments within the source code; and
   performing natural language processing on the identified comments to identify data operations that are performed within the source code; and
the metadata for the source code comprises information associated with the identified data operations.

13. The method of claim 12, wherein the graphical representation comprises a text description for the source code based at least in part on the identified comments within the source code.

14. The method of claim 9, further comprising detecting a triggering event in response to the source code being stored in a database; and
wherein receiving the source code for the application in response to the triggering event.

15. A computer program comprising executable instructions stored in a non-transitory computer readable medium that when executed by a processor causes the processor to:
receive source code for an application;
analyze the source code to generate metadata for the source code, wherein:
   analyzing the source code comprises:
      executing the source code; and
      tracking variable changes while executing the source code; and
   the metadata identifies operations performed within the source code;
identifying information that is associated with a sequence of data operations that are performed by the source code within the metadata for the source code;
populating a field of a source code model with the information that is associated with the sequence of data operations that are performed by the source code in accordance with source code modeling instructions, wherein:
   the source code modeling instructions comprise a plurality of metadata associated with the source code; and
   each metadata is associated with a field of the source code model;
generating at least a portion of an architecture based on the populated field of the source code model in accordance with visualization instructions to generate a graphical representation of the source code model, wherein the visualization instructions comprise instructions for converting the source code model into the graphical representation of the source code model; and
output the graphical representation.

16. The computer program of claim 15, wherein:
analyzing the source code comprises identifying data flow paths within the source code; and
the metadata for the source code comprises information associated with the identified data flow paths within the source code.

17. The computer program of claim 15, wherein:
analyzing the source code comprises identifying branching logic within the source code; and
the metadata for the source code comprises information associated with the identified branching logic within the source code.

18. The computer program of claim 15, wherein:
analyzing the source code comprises:
   identifying comments within the source code; and
   performing natural language processing on the identified comments to identify data operations that are performed within the source code; and
the metadata for the source code comprises information associated with the identified data operations.

19. The computer program of claim 18, wherein the graphical representation comprises a text description for the source code based at least in part on the identified comments within the source code.

20. The computer program of claim 15, further comprising instructions that when executed by the processor causes the processor to detect a triggering event in response to the source code being stored in a database; and
wherein receiving the source code for the application in response to the triggering event.

* * * * *